(12) United States Patent
Beltz et al.

(10) Patent No.: US 7,142,640 B2
(45) Date of Patent: Nov. 28, 2006

(54) METHOD AND SYSTEM OF REMOTELY RESTORING COMMUNICATION LINES

(75) Inventors: Scott A. Beltz, South Lyon, MI (US); Jeffrey Scott Lindgren, Haltom City, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 10/814,798

(22) Filed: Mar. 31, 2004

(65) Prior Publication Data

US 2005/0220276 A1    Oct. 6, 2005

(51) Int. Cl.
*H04M 1/24* (2006.01)
*H04M 15/00* (2006.01)
*H04M 7/00* (2006.01)
*H04L 1/00* (2006.01)
*G01R 31/28* (2006.01)

(52) U.S. Cl. .................. 379/9.05; 379/112.02; 379/221.04; 370/216; 714/13

(58) Field of Classification Search .......... 379/9.02, 379/9.03, 9.05, 112.02, 221.03, 221.04, 15.01, 379/15.03, 17; 714/2, 10, 13; 340/507, 340/508, 825, 825.01, 2.27, 2.28; 370/216, 370/219, 220, 227, 228

See application file for complete search history.

(56) References Cited

U.S. PATENT DOCUMENTS

| | | | | |
|---|---|---|---|---|
| 4,094,072 A * | 6/1978 | Erb | .................... | 33/508 |
| 4,878,048 A * | 10/1989 | Gottesman et al. | ..... | 340/825.01 |
| 5,309,499 A * | 5/1994 | Webber | .................. | 379/9.05 |
| 5,459,716 A * | 10/1995 | Fahim et al. | ............... | 370/228 |
| 5,577,096 A * | 11/1996 | Kitano et al. | .................. | 379/2 |
| 5,719,917 A * | 2/1998 | DeBalko | .................. | 379/2 |
| 5,963,634 A * | 10/1999 | Kantola et al. | ............. | 379/279 |
| 6,018,576 A * | 1/2000 | Croslin | ................ | 379/22.03 |
| 6,031,906 A | 2/2000 | Rao | | |
| 6,038,303 A * | 3/2000 | Sanford et al. | ........ | 379/201.01 |
| 6,084,853 A | 7/2000 | Rao | | |
| 6,097,515 A * | 8/2000 | Pomp et al. | ................. | 398/45 |
| 6,115,355 A | 9/2000 | Rao | | |
| 6,215,867 B1 * | 4/2001 | Eslambolchi | ............... | 379/229 |
| 6,298,119 B1 * | 10/2001 | Shaffer et al. | ........... | 379/29.07 |
| 6,577,728 B1 | 6/2003 | Rao | | |

* cited by examiner

*Primary Examiner*—Quoc Tran
(74) *Attorney, Agent, or Firm*—Toler Schaffer, LLP

(57) ABSTRACT

The disclosure relates generally to a system of restoring communication circuits. The system includes an automated circuit switchover system embedded within a telephone central office, a technician terminal for use by telephone network operations personnel, a test and control system coupled to the technician terminal and to the automated circuit switchover system within the telephone central office, and a switchable protection circuit remotely located from the telephone central office and coupled to the telephone central office via a communication link. The switchable protection circuit supports a plurality of active individual communication lines and an unused spare communication line. Each of the active individual communication lines are configured to support communication of traffic from end user subscribers supported by the active individual communications lines connected to the switchable protection circuit and to the telephone central office. The switchable protection circuit is responsive to the test and control system and includes logic to respond to a specific command sent from the test and control system to switch a selected one of the plurality of active individual communication lines to the unused spare communication line and to activate the spare communication line in response to the specific command to support communications traffic over the spare communication line.

19 Claims, 2 Drawing Sheets

METHOD AND SYSTEM OF REMOTELY RESTORING COMMUNICATION LINES

FIELD OF THE INVENTION

The present disclosure relates generally to remote communication circuit restoration.

BACKGROUND

A large component of time and expense incurred during the restoration of DS1 communication circuits where trouble tickets have been reported is due to the physical dispatch of field service technicians. Ultimately, restoration of DS1 type circuits by using a spare span involves an initial dispatch to the field unit along with a subsequent dispatch to repair the main circuit. A third action is also needed to restore the spare and the main to their original condition. These events, in the past, have been a major source of operating expense, and significantly impact meantime to repair (MTTR) results. While certain systems have been disclosed that relate to providing continued access to subscriber lines, such systems tend to be large and complex and too expensive for wide deployment in a telephone network for various types of business and residential subscribers. For example, U.S. Pat. No. 6,577,728 illustrates an automated restoration system that utilizes an expensive switching system for restoration.

Accordingly, there is a need for an improved and low cost method and system of restoring service relating to DS1 trouble tickets.

DETAILED DESCRIPTION OF THE DRAWINGS

Figure 1:
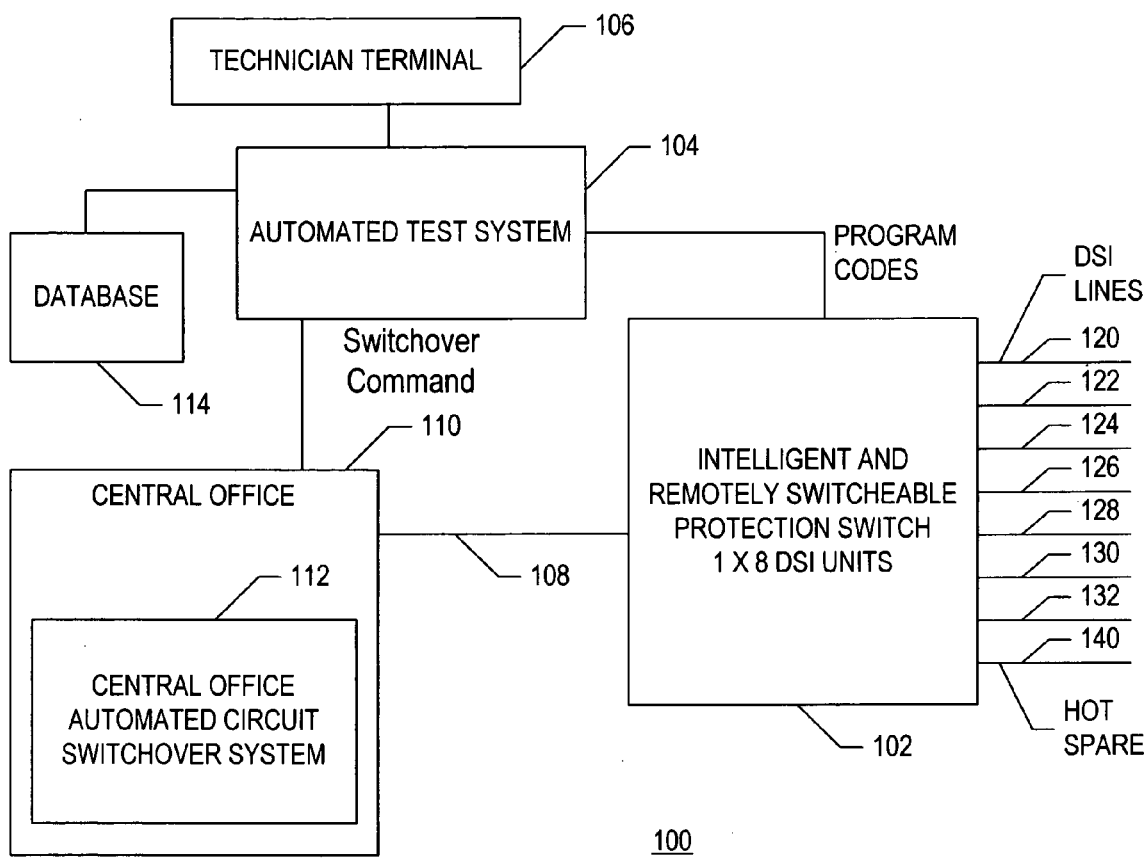
FIG. 1 is a block diagram that illustrates a system used to restore DS1 lines.

The disclosure relates generally to a system and method of restoring communication circuits. In a particular embodiment, the system includes an automated circuit switchover system embedded within a telephone central office, a technician terminal for use by telephone network operations personnel, a test and control system coupled to the technician terminal and to the automated circuit switchover system within the telephone central office, and a switchable protection circuit remotely located from the telephone central office and coupled to the telephone central office via a communication link.

The switchable protection circuit supports a plurality of active individual communication lines and an unused spare communication line. Each of the active individual communication lines are configured to support communication of traffic from end user subscribers supported by the active individual communications lines connected to the switchable protection circuit and to the telephone central office. The switchable protection circuit is responsive to the test and control system and includes logic to respond to a specific command sent from the test and control system to switch a selected one of the plurality of active individual communication lines to the unused spare communication line and to activate the spare communication line in response to the specific command to support communications traffic over the spare communication line.

In a particular embodiment, the method includes receiving a reported problem associated with an individual subscriber communication line, entering a trouble ticket into a trouble ticket tracking database using an operations terminal, initiating a test of the individual communication line using an automated test system, determining whether the individual subscriber communication line is supported by a remote switch protection device, sending a program code to the remote switch protection device to request the switch protection device to swap the individual subscriber communication line with a spare communication line, and sending a switch-to-spare circuit command to a telephone exchange and reporting a corrected circuit condition. The telephone exchange includes a telephone circuit communicatively coupled to the individual subscriber communication line and to the remote switch protection device. The telephone exchange automatically switches the telephone circuit from the individual subscriber communication line to the spare communication line, Referring to FIG. 1, a system for providing automated circuit switchover is illustrated. The system includes a central office 110, and an intelligent and remotely switchable protection switch unit 102. The central office 110 is remotely located from and communicatively coupled to the switchable protection circuit 102 via a communication line 108, such as a T1 line. The system also includes an automated test system 104 and a technician work station terminal 106. The automated test system 104 is coupled to an external database 114. The automated test system 104 is also coupled to the central office 110 and to the remote switchable protection switch 102. In a particular embodiment, the central office 110 is a telephone central office and includes an automated circuit switchover system 112. The intelligent and remotely switchable protection switch 102 in a particular embodiment is a 1×8 DS1 type switch that includes up to seven DS1 lines and one hot spare line. Each of the active individual communication lines of the switchable protection switch 102 are configured to support communication of traffic from end user subscribers, such as subscribers connected to the representative DS1 lines 120, 122, 124, 126, 128, 130, and 132. The switchable protection switch 102 also includes a hot spare line 140. The hot spare line 140 is typically unused but may be activated when one of the other DS1 lines has a fault condition.

During operation, a technician working at the technician terminal 106 may receive a request from a subscriber to correct a circuit failure with a communication line, such as one of the DS1 communication lines 120–132. The technician at the technician terminal 106 enters a trouble ticket for the reported DS1 line and the trouble ticket is entered into the automated test system 104. The automated test system 104 creates a log of the trouble ticket and stores the trouble ticket in the database 114. The automated test system 104 may initiate performing a test to confirm the faulty DS1 line. After confirming a problem circuit, the automated test system 104 sends a special command, such as a program code, to the remote switchable protection switch 102. When the switchable protection switch 102 receives the program code from the automated test system 104, the switchable protection switch responds to the program code and switches the faulty DS1 line to the hot spare line 140.

In addition, the automated test system 104 communicates a command to the central office 110 which in turn provides the command to the central office automated circuit switchover system 112. The automated circuit switchover system 112 within the central office 110 performs a corresponding switchover action for the subscriber line that has been switched over to the hot spare line 140. After the particular DS1 line has been switched to the hot spare 140, and after the central office 110 has been; reconfigured to support the switched connection, the end subscriber may then again communicate traffic from their location to the network supported by the central office 110. Thus, after the switchover, the hot spare communication line 140 has been activated in response to the specific command initiated by the technician terminal 106 in response to the subscriber request. In a particular embodiment, the special command is a sequence of program codes that are communicated from the automated test system 104 to the intelligent and remotely switchable protection switch 102. In addition, in a particular embodiment the communication link 108 may be a single T1 line or may be a higher data rate telephony communication link.

Figure 2:
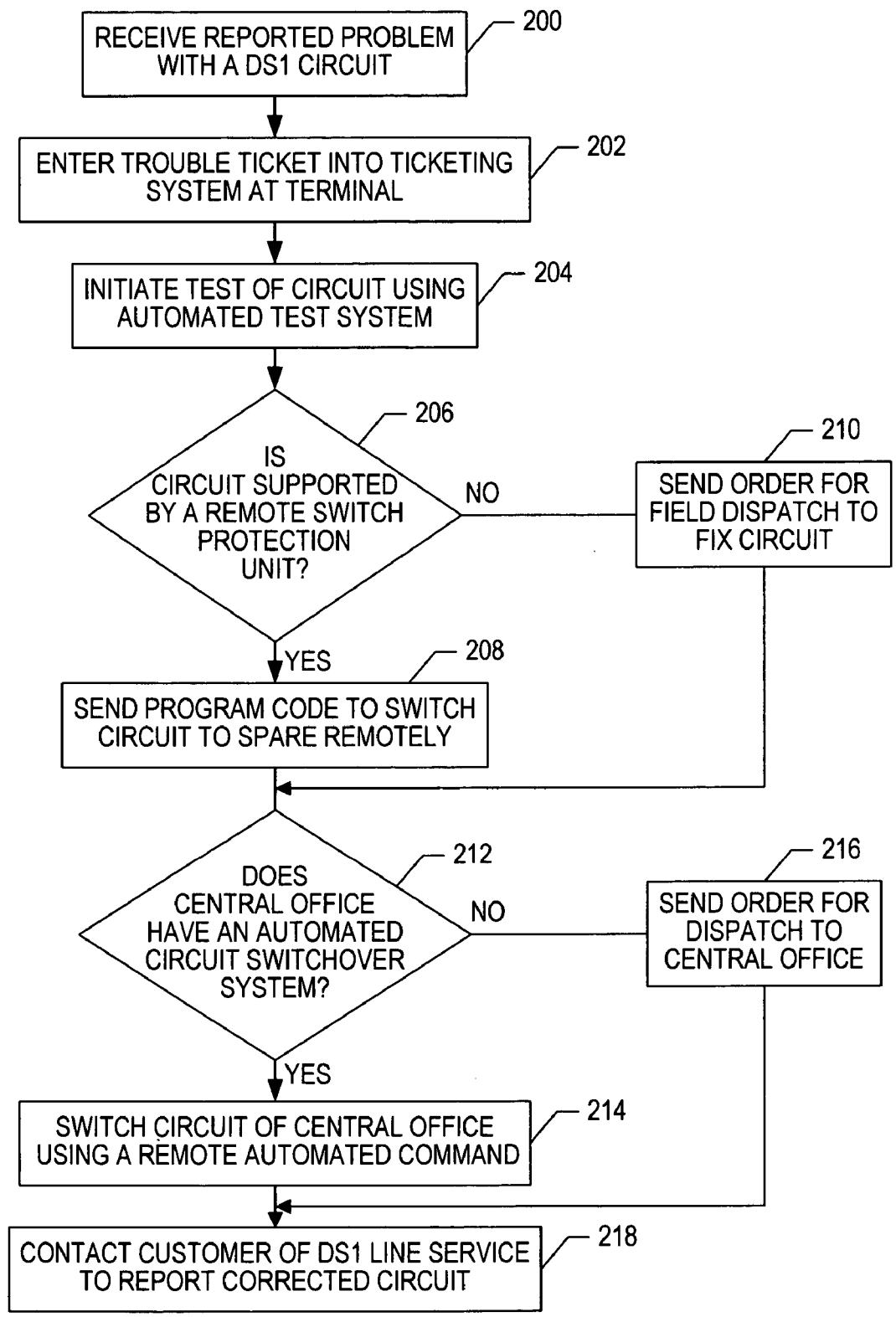
FIG. 2 is a flow chart that illustrates a method of operation with respect to the system of FIG. 1.

Referring to FIG. 2 a particular method of operating the system of FIG. 1 is illustrated. A reported problem with a particular DS1 circuit is received, at step 200. In response to the received problem, a trouble ticket is entered into an interface of a ticketing system at a work station or terminal, at 202. In response to the trouble ticket, a test is initiated to test the reported circuit using an automated test system, at 204. The test may be performed to verify the status of the circuit as having a faulty condition. At decision step 206, it is determined whether the circuit having the reported trouble condition is supported by a remote switch protection unit. If the circuit is supported by a remote switch protection unit then a program code or other special command is sent to the switch circuit to remotely switch to a spare circuit, at 208.

If the trouble circuit is not supported by a remote switch protection unit then an order is sent into the field for a dispatch to fix the problem circuit, at 210. In either situation, a decision is made as to whether the central office supporting the trouble circuit has an automated circuit switchover system, at decision step 212. Where the central office does not support the automated switchover system, then an order is sent for a special technician dispatch to the central office, at 216. The dispatch in this case is a manual dispatch of a technician or other technical personnel to make a change at the central office to correspond to the switched circuit. In the event that the central office has an automated circuit switchover system, then a connection at the central office is switched using a remote automated command, at 214. After correcting the circuit by switching the subscriber circuit to a spare and after making the corresponding adjustment at the central office, the subscriber may then be contacted to inform the subscriber that the DS1 line has been corrected and communication traffic, such as data or voice traffic, may then be resumed, as shown at 218.

Thus, the system and method illustrated may be used to deploy an intelligent and remotely switchable 1×8 DS1 protection unit, such as a ProCap-DS1 protection switch. Such units can be programmed to receive automated code sequences from an automated test system, such as the ATAS operating system, so that DS1 communication lines supported by the remote devices can be switched to a hot spare protection path in as little as twenty minutes or less. The entire process from initiation of a trouble ticket to testing and switch over of the circuit to the protected hot spare, can be fully automated. Using an automated system as shown can eliminate the expense and dispatch time associated with manually initiating a technician to the field to cut to a spare circuit and to perform the corresponding actions needed in the central office for the switchover.

An example of the remotely switchable protection switch 102 that may be utilized is a device known as the Pro-Cap unit which is a joint development of ADTRAN and HyperEdge. Deployment of the automated system as described provides a telephony operator with many advantages, such as reducing the mean time to repair (MTTR) for certain subscriber circuit problems. In addition, the disclosed system and method allow remote restoration of customer service while avoiding the costly and time consuming dispatch of a technician to perform repair work. Further, the disclosed system and method can provide improved efficiency of the central office and testing centers since the amount of time needed to isolate problems with subscriber service conditions has been significantly reduced. In addition, by providing subscribers with corrected circuits in an automated and time reduced fashion, increased good will with subscribers and improved network service may be realized.

While a single central office and remote switchable protection switch has been illustrated, it should be understood that hundreds or thousands of protection circuits may be deployed and connected to many central offices over a wide geographic area where telephone service has been deployed. In such a wide area deployment, it is important to provide switchable protection switches in, the network at a low per unit cost. The disclosed Pro-Cap switch has a per unit cost that is significantly less than more complex systems, such as the system described in U.S. Pat. No. 6,577,728.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a test and control system including a first input coupled to a technician terminal, a first output to send a command signal to an automated circuit switchover system within a telephone central office and a second output coupled to a switchable protection circuit; and
   wherein the switchable protection circuit is remotely located from the telephone central office and coupled to the telephone central office via a communication link, the switchable protection circuit supporting a plurality of active individual communication lines and an unused spare communication line, each of the active individual communication lines configured to support communication of traffic from end user subscribers supported by the active individual communications lines connected to the switchable protection circuit to the telephone central office, the switchable protection circuit responsive to the test and control system and including logic to respond to a specific command sent from the test and control system via the second output to switch a selected one of the plurality of active individual communication lines to the unused spare communication line and to activate the spare communication line in response to the specific command to support communications traffic over the spare communication line.

2. The system of claim 1, wherein the special command is sent from the test and control system in response to a technician command processed at the technician terminal.

3. The system of claim 2, wherein the technician command is initiated in response to a subscriber reported problem with one of the plurality of individual communication lines.

4. The system of claim 1, wherein the plurality of individual communication lines are DS1 lines.

5. The system of claim 1, wherein the communication link is a multiplexed T1 line.

6. The system of claim 1, wherein the technician terminal has an interface to enable a user to enter a circuit trouble ticket into a circuit trouble ticket reporting system.

7. The system of claim 1, wherein the special command is a specific sequence of program codes.

8. The system of claim 1, wherein a command is sent from the test and control system via the first output to automatically implement a circuit change at the telephone central office that corresponds to the change to the spare communication line made at the remote switchable protection circuit.

9. The system of claim 1, wherein the switchable protection circuit supports seven active lines and one hot spare line.

10. A method of responding to a subscriber communication line problem report, the method comprising:
    receiving a reported problem associated with an individual subscriber communication line;
    entering a trouble ticket into a trouble ticket tracking database using an operations terminal;
    initiating a test of the individual communication line using an automated test system, the automated test system responsive to the operations terminal;
    determining whether the individual subscriber communication line is supported by a remote switch protection device;
    sending a program code to the remote switch protection device via a first communication path from the automated test system to the remote switch protection device to request the remote switch protection device to swap the individual subscriber communication line with a spare communication line; and
    sending a switch-to-spare circuit command to a telephone exchange via a second communication path from the automated test system to the telephone exchange, the telephone exchange including a telephone circuit communicatively coupled to the individual subscriber communication line and to the remote switch protection device, the telephone exchange automatically switching the telephone circuit from the individual-subscriber communication line to the spare communication line.

11. The method of claim 10, further comprising communicating a corrected circuit condition to the subscriber that initiated the problem report.

12. The method of claim 10, wherein an automated circuit switchover system embedded within the telephone exchange performs the step of automatically switching the telephone circuit from the individual subscriber communication line to the spare communication line.

13. The method of claim 12, wherein the automated test system comprises a test and control system, the automated test system coupled to the operations terminal and configured to communicate with the automated circuit switchover system within the telephone exchange.

14. The method of claim 10, wherein the remote switch protection device includes a switchable protection circuit, the remote switch protection device coupled to the telephone exchange via a communication link, wherein the switchable protection circuit supports a plurality of active individual communication lines and an unused spare communication line, each of the active individual communication lines configured to support communication of traffic from end user subscribers supported by the active individual communications lines connected to the switchable protection circuit and to the telephone exchange.

15. The method of claim 14, wherein the switch protection device includes logic to respond to the program code sent from the automated test system, and where the switch protection device selectively connects one of the plurality of active individual communication lines to the unused spare communication line and activates the spare communication line to support communications traffic over the spare communication line.

16. A method of responding to a subscriber communication line problem report, the method comprising:
    initiating a test of subscriber communication line using an automated test system, the automated test system responsive to an operations terminal trouble ticket report relating to a reported problem associated with the individual subscriber communication line;
    communicating a program code over a first communication path from the automated test system to a switch protection device, the switch protection device supporting the subscriber communication line, the program code to request the switch protection device to swap the subscriber communication line with a spare communication line;
    communicating a switch-to-spare circuit command over a second communication path from the automated test system to a telephone exchange, the telephone exchange including a telephone circuit communicatively coupled to the subscriber communication line and to the switch protection device via a DS1 communications link, the telephone exchange automatically switching the telephone circuit from the subscriber communication line to the spare communication line.

17. The method of claim 16, further comprising:
    reporting a corrected circuit condition for the subscriber communication line.

18. The method of claim 16, wherein communicating the switch-to-spare circuit command occurs after communicating the program code.

19. The method of claim 16, wherein the switch protection device supports seven active lines and one hot spare line.

* * * * *